United States Patent
Choi

(10) Patent No.: US 8,282,129 B2
(45) Date of Patent: Oct. 9, 2012

(54) AIR BAG CUSHION FOR VEHICLES

(75) Inventor: Hyeong Ho Choi, Gwangmyeong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 415 days.

(21) Appl. No.: 12/619,205

(22) Filed: Nov. 16, 2009

(65) Prior Publication Data

US 2011/0025024 A1 Feb. 3, 2011

(30) Foreign Application Priority Data

Jul. 31, 2009 (KR) .................... 10-2009-0070925

(51) Int. Cl.
*B60R 21/231* (2011.01)
(52) U.S. Cl. .................... 280/743.1; 280/729
(58) Field of Classification Search ........... 280/729, 280/743.1, 743.2, 731
See application file for complete search history.

(56) References Cited

U.S. PATENT DOCUMENTS

| | | | | |
|---|---|---|---|---|
| 6,478,329 B1 * | 11/2002 | Yokoyama | .................... | 280/729 |
| 6,834,884 B2 * | 12/2004 | Gu | .................. | 280/729 |
| 7,052,042 B2 * | 5/2006 | Sato et al. | .................. | 280/743.1 |
| 7,108,278 B2 * | 9/2006 | Kai et al. | .................. | 280/730.2 |
| 7,152,877 B2 * | 12/2006 | Hasebe et al. | ............. | 280/743.1 |
| 7,360,789 B2 * | 4/2008 | Bito | ............ | 280/743.1 |
| 7,503,582 B2 * | 3/2009 | Sendelbach et al. | ........ | 280/743.1 |
| 7,611,164 B2 * | 11/2009 | Kai et al. | .................... | 280/729 |
| 7,631,895 B2 * | 12/2009 | Kalliske et al. | ............ | 280/743.2 |
| 7,648,158 B2 * | 1/2010 | Hasebe | .......................... | 280/729 |
| 7,681,909 B2 * | 3/2010 | Idomoto et al. | ................ | 280/729 |
| 7,841,622 B2 * | 11/2010 | Pausch et al. | .............. | 280/743.2 |
| 7,871,104 B2 * | 1/2011 | Hayashi | ...................... | 280/730.2 |
| 7,909,362 B2 * | 3/2011 | Idomoto et al. | ............ | 280/743.1 |
| 7,934,747 B2 * | 5/2011 | Miyata | .......................... | 280/729 |
| 2003/0218325 A1 * | 11/2003 | Hasebe et al. | ............. | 280/743.2 |
| 2004/0155440 A1 * | 8/2004 | Hasebe et al. | ................ | 280/729 |
| 2005/0184489 A1 * | 8/2005 | Kobayashi | ..................... | 280/729 |
| 2006/0103118 A1 * | 5/2006 | Hasebe | .......................... | 280/729 |
| 2006/0131859 A1 * | 6/2006 | Kumagai | .................... | 280/743.1 |
| 2006/0197318 A1 * | 9/2006 | Choi et al. | ..................... | 280/729 |
| 2007/0205590 A1 * | 9/2007 | Klinkenberger et al. | .. | 280/743.2 |
| 2007/0228701 A1 * | 10/2007 | Yamamura | .................. | 280/730.2 |
| 2007/0267854 A1 * | 11/2007 | Fukuda et al. | ............. | 280/730.2 |
| 2008/0203710 A1 * | 8/2008 | Kalliske et al. | ............... | 280/729 |
| 2008/0252054 A1 * | 10/2008 | Kim et al. | ................... | 280/743.2 |
| 2010/0156078 A1 * | 6/2010 | Miyata | ........................ | 280/743.2 |

FOREIGN PATENT DOCUMENTS

KR 10-2008-0093252 A 10/2008

\* cited by examiner

*Primary Examiner* — Paul N Dickson
*Assistant Examiner* — Nicole Verley
(74) *Attorney, Agent, or Firm* — Morgan, Lewis & Bockius LLP

(57) ABSTRACT

An air bag cushion for vehicles has a connection part which is formed in front portions of the left and right chambers by sewing the inner surfaces of the left and right chambers along sewing lines in a shape of closed curve to form a vertical valley which separates the left and right chambers from each other. A through hole is formed in the connection part to permit gas to flow between the left and right chambers. The cushion includes a tether which passes through the connection part and connects the left and right chambers to each other in a lateral direction of the cushion. The air bag cushion is simple in structure and is superior in uniform expanding performance of the left and right chambers.

11 Claims, 13 Drawing Sheets

AIR BAG CUSHION FOR VEHICLES

CROSS-REFERENCE TO RELATED APPLICATION

The present application claims priority of Korean Patent Application Number 10-2009-0070925 filed on Jul. 31, 2009, the entire contents of which application is incorporated herein for all purposes by this reference.

BACKGROUND OF THE INVENTION

1. Field of the Invention

The present invention relates generally to an air bag cushion for vehicles intended to protect a passenger and, more particularly, to an air bag cushion for a front passenger seat.

2. Description of Related Art

Recently, with the increasing demands on the safety and protection for passengers, the ratio of vehicles equipped with front passenger air bags are on the increase.

A conventional front passenger air bag may be not helpful, rather dangerous for a child sitting in a front passenger seat. That is because children are usually seated on the front passenger seat using a child restraint system (CRS) and positioned on a side of front edge of the front passenger seat. In this case, the sudden expansive force of an air bag cushion in an initial expansion stage may strike a child's face and cause a neck injury of the child.

FIG. 1A is a view illustrating the expansion of an air bag cushion for a front passenger seat which was developed recently. The air bag cushion 1 is constructed so that a vertical valley 4 is formed between left and right chambers 2 and 3 (hereinafter, referred to as a 'vertical two-chamber structure'). The left chamber 2 expands towards the left side of the upper part of the body of a passenger (not shown), the right chamber 3 expands towards the right side of the upper part of the passenger's body, and the upper portion of the valley 4 comes into contact with the passenger's face. Reference numeral 5 denotes an exterior vent hole for discharging gas from the air bag cushion. The air bag cushion 1 is designed such that a child's face comes to rest on the valley 4, mainly, on a portion around the lower end of the valley 4 in the event of a vehicle collision, thus preventing the child from being injured, unlike a conventional air bag cushion.

However, the air bag cushion having the vertical two-chamber structure shown in FIG. 1A is complicated in structure. In the process of manufacturing the air bag cushion, operations of sewing two sheets 6 and 7 along their edges as shown in FIG. 1B are frequently required. In this case, remnants 9 may be undesirably left behind outside of the sewing lines 8. In order to make the appearance good, the sheets 6 and 7 sewn along the edges as shown in FIG. 1B must be turned inside out so that the remnants 9 are not exposed to the outside of the finished air bag cushion. In the case of the vertical two-chamber structure requiring the sewing of several sheets, the sequence of sewing is complicated, so that the structure and manufacture of the air bag cushion are complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, the present invention has been made keeping in mind the above problems occurring in the prior art, and the present invention provides for an air bag cushion for vehicles having a vertical two-chamber structure, which is simple in structure.

The present invention also provides for an air bag cushion for vehicles having a vertical two-chamber structure, which allows symmetric and uniform expansion of two chambers thereof.

The present invention further provides for an air bag cushion for vehicles having a vertical two-chamber structure, in which a variety of shapes of the valley between the two chambers can be achieved easily.

In order to accomplish such, the present invention provides an air bag cushion, including a left chamber configured to be expanded towards a left side of an upper part of a body of a passenger, a right chamber configured to be expanded towards a right side of the upper part of the body of the passenger, and at least one connection part formed in front portions of the left and right chambers by sewing facing inner surfaces of the left and right chambers along sewing lines in a shape of closed curve to form a vertical valley which separates the left and right chambers from each other. A through hole is formed in the connection part to permit gas to flow between the left and right chambers.

The left chamber may include a left outer sheet and a left inner sheet sewn along an edge thereof to the left outer sheet. The right chamber may include a right inner sheet sewn to the left inner sheet at the connection part and a rear end thereof, and a right outer sheet sewn along an edge thereof to the right inner sheet.

The left chamber may be provided by sewing the left and right inner sheets to each other at the connection part, sewing the left outer sheet and the left inner sheet to each other along edges thereof with the right inner sheet placed between the left outer sheet and the left inner sheet, and turning the left outer sheet inside out.

The right chamber may be provided by sewing the left and right inner sheets to each other at the connection part, sewing the right outer sheet and the right inner sheet to each other along edges thereof with the left inner sheet placed between the right outer sheet and the right inner sheet, and turning the right outer sheet inside out.

Further, rear ends of the left and right inner sheets may be sewn vertically and horizontally so that a partition part is provided at rear ends of the left and right chambers to partition the left and right chambers from each other.

Further, a gap at which the left and right inner sheets are not sewn may be provided between the connection part and the partition part.

Further, a gas injection part may be provided in the rear ends of the left and right chambers in such a way as to communicate with the chambers, with gas being injected from the inflator to the gas injection part.

The air bag cushion may further include at least one joining part placed in front of the connection part and provided by sewing the left and right inner sheets to each other along sewing lines in a shape of a closed curve.

The joining part may be formed to become ripped more easily than the connection part.

The air bag cushion may further include a tether which passes through the connection part and connects the left and right chambers to each other in a lateral direction of the air bag cushion.

Further, one end of the tether may be connected to the left outer sheet and the other end may be connected to the right outer sheet.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
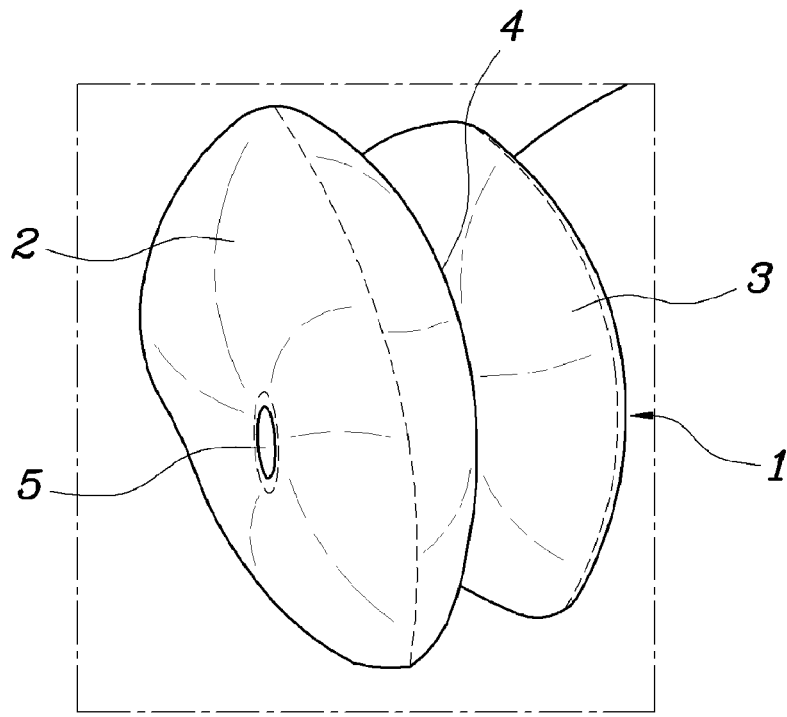
FIG. 1A is a view illustrating a conventional air bag cushion.
Figure 1B:
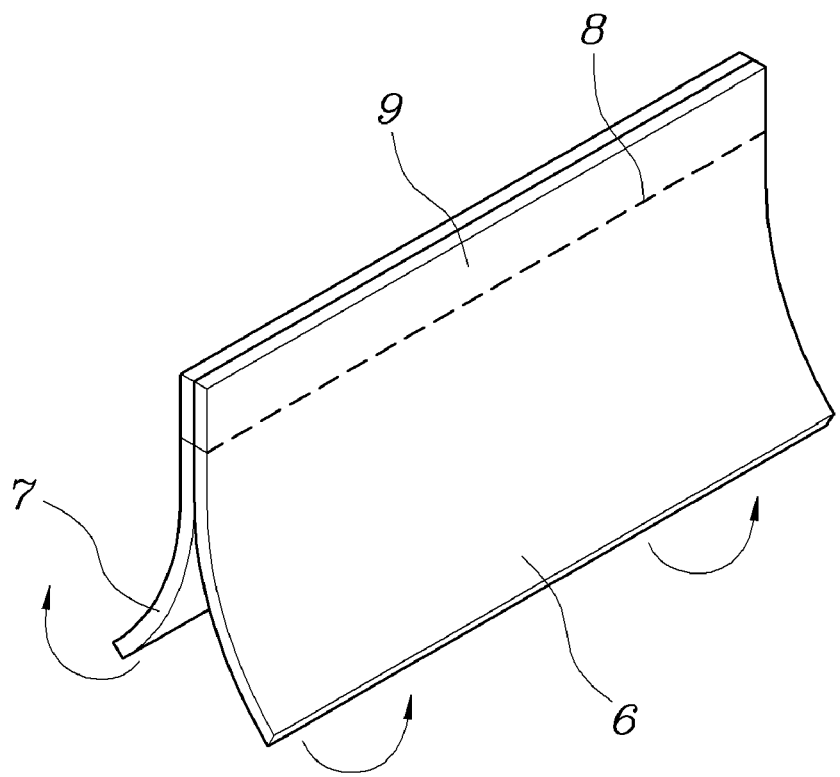
FIG. 1B is a view illustrating the process of manufacturing the conventional air bag cushion.
Figure 2:
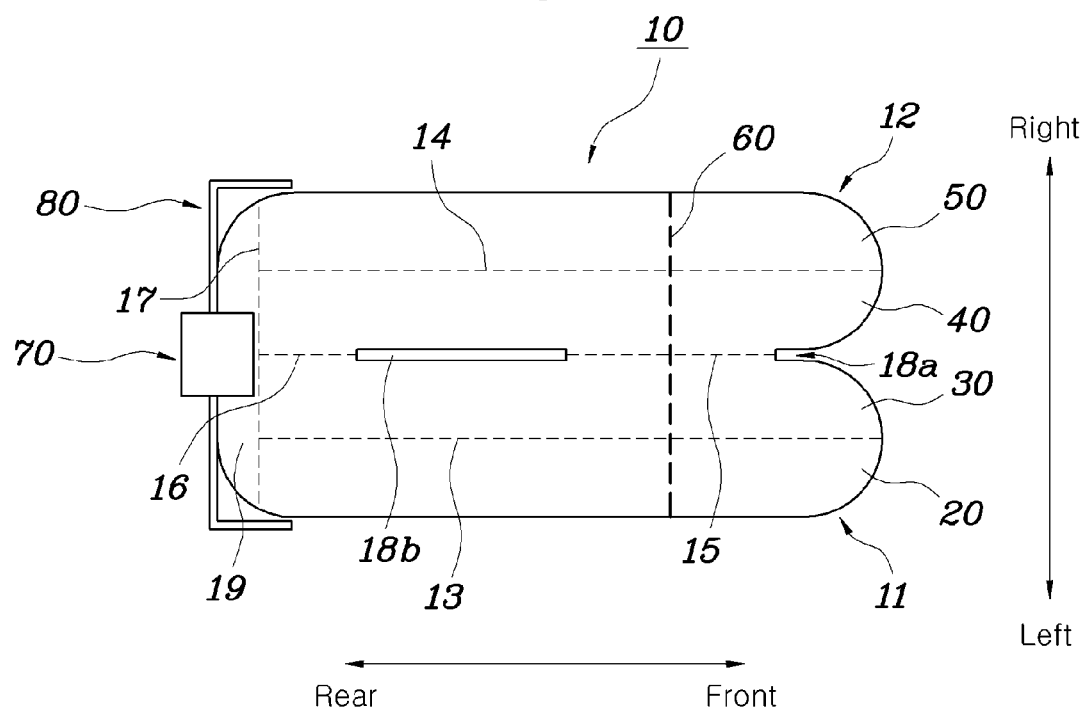
FIG. 2 is a schematic view illustrating an air bag cushion according to the present invention.

As shown in FIG. 2, the air bag cushion 10 is constructed so that a vertical valley 18a is formed on the front portions of left and right chambers 11 and 12 to separate the chambers 11 and 12 from each other. The left and right chambers 11 and 12 are sewn to each other at a connection part 15 and a partition part 16. A gap 18b at which both chambers 11 and 12 are not sewn is provided between the connection part 15 and the partition part 16.

A gas injection part 19 is provided on the rear ends of the left and right chambers 11 and 12. A housing 80 for accommodating the air bag cushion 10 and an inflator 70 supported by the housing 80 are installed around the gas injection part 19. The inflator 70 is mounted outside the air bag cushion 10 and a gas discharge port of the inflator 70 is partially inserted into the cushion 10. Of course, the inflator 70 may be installed inside the air bag cushion 10.

The gas, injected from the inflator 70 to the gas injection part 19, is supplied to the left and right chambers via the partition part 16 which partitions the left and right chambers at the rear side of the air bag cushion 10. Reference numeral 17 denotes sewing lines which define the gas injection part 19. The sewing lines 17 of the gas injection part 19 will be described in detail with reference to FIG. 3. In this context, it should be understood that the well known retainer ring placed in the air bag cushion 10 for retaining the inflator 70 to the cushion 10 is not shown in FIG. 2.

At least one through hole 15b (see FIG. 3) is formed in each connection part 15 to permit air to flow between the left and right chambers 11 and 12. The gas may be non-uniformly supplied from the gas injection part 19 to the left and right chambers 11 and 12, and the expansion speed of the chambers 11 and 12 may be different. The through hole 15b allows the gas to be uniformly dispersed to both chambers 11 and 12, thus causing the chambers 11 and 12 to uniformly and symmetrically expand.

Still referring to FIG. 2, a tether 60 is provided on the front portions of the left and right chambers 11 and 12 and passes through the connection part 15 to connect the left and right chambers 11 and 12 to each other in a direction from the left side of the cushion 10 to the right side thereof.

The tether 60 functions to hold the shape of the air bag cushion 10 during and after the expansion of the cushion 10 and make the two chambers 11 and 12 expand symmetrically. For example, if the expanding speed of the left chamber 11 is higher than that of the right chamber 12 as a result of non-uniform supply to both chambers 11 and 12, the tether 60 delays the expansion of the left chamber 11 and make pressurized gas be distributed from the left chamber 11 through the through hole 15b to the right chamber 12.

The construction and components of the air bag cushion 10 will be described with reference to FIGS. 2 and 3.

The left chamber 11 is manufactured by sewing a left outer sheet 20 and a left inner sheet 30 along edge sewing lines 13. The right chamber 12 is manufactured by sewing a right outer sheet 50 and a right inner sheet 40 along edge sewing lines 14. The left inner sheet 30 and the right inner sheet 40 are sewn at their rear ends 32 and 42 with the connection part 15.

At least one through hole 15b is formed in an area forming the connection part 15 of each of the left and right inner sheets 30 and 40. When the through hole 15b is too small, it is insufficient to remove the non-uniform expansive pressure of the left and right chambers 11 and 12. In contrast, when the through hole 15b is too large, the external impact bearing force of the cushion 10 may be reduced. Thus, it is preferable that one or several through holes 15b having a proper size be formed. The left and right inner sheets 30 and 40 may be sewn around the through holes 15b, in addition to the sewing lines 15a of the connection part 15.

Sewing lines provided at the rear ends 32 and 42 of the left and right inner sheets 30 and 40 define the partition part 16 which is provided on the rear ends of the left and right chambers 11 and 12 to partition them from each other. The gas, which is injected from the inflator 70 to the gas injection part 19, is divided at the partition part 16 and supplied to the left and right chambers 11 and 12. The sewing lines of the partition part 16 are formed horizontally as well as vertically. A bolt inserted from the known retainer ring is fastened through a mounting hole 72 so that the inflator 70 is locked to the air bag cushion 10.

Figure 3:
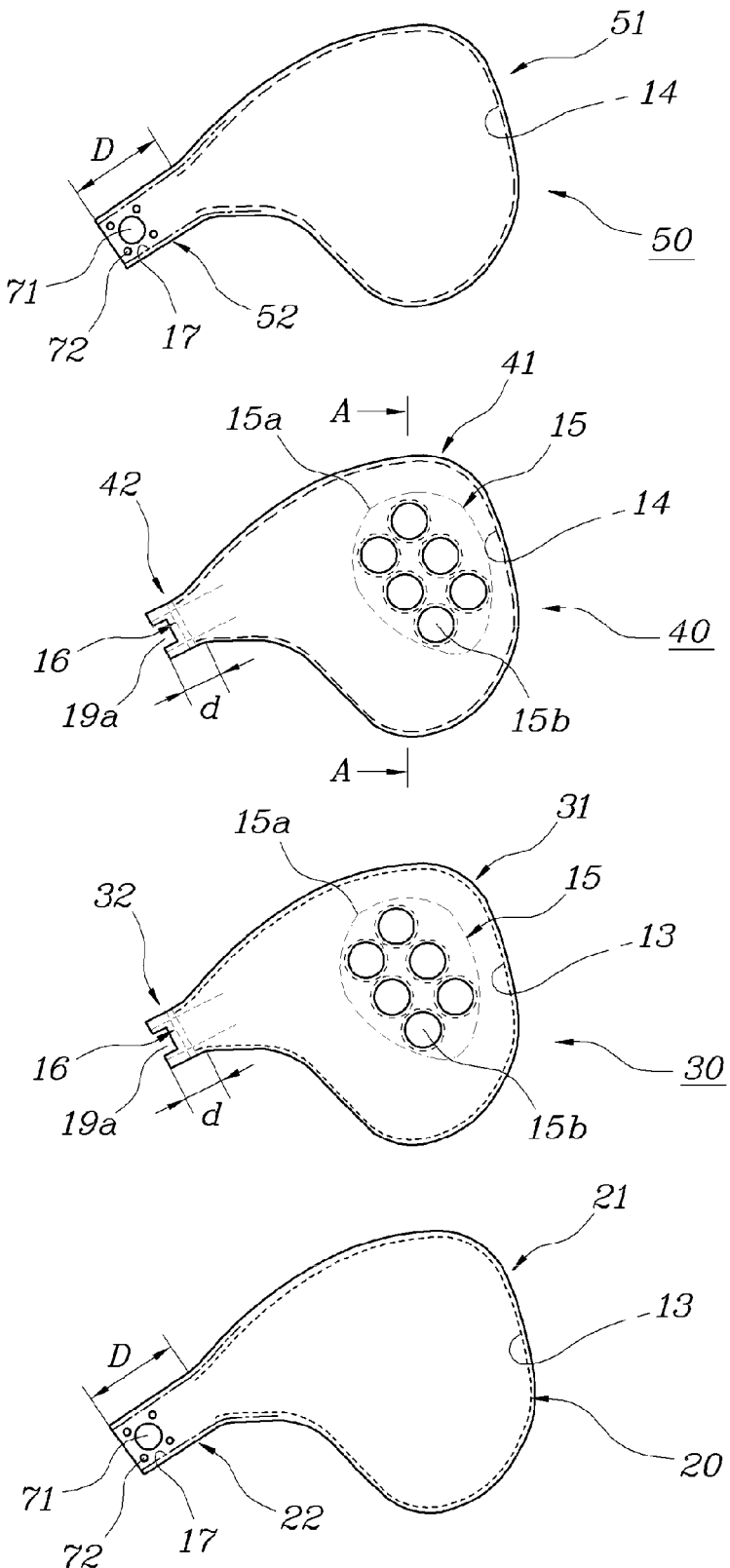
FIG. 3 is a schematic exploded view illustrating the air bag cushion of FIG. 2.

Meanwhile, as shown in FIG. 3, the length D of the rear ends 22 and 52 of the left and right outer sheets 20 and 50 is longer than the length d of the rear ends 32 and 42 of the left and right inner sheets 30 and 40. The reason for this is because openings formed in the rear portions of the chambers 10 and 20 are closed (see FIGS. 5A and 5B) using the rear ends 32 and 42 and the gas injection part 19 is formed in the openings. A recess 19a is provided in the rear ends 32 and 42 of the left and right inner sheets 30 and 40 to provide the gas injection part 19, and inflator holes 71 and mounting holes 72 are formed in the rear ends 22 and 52 of the left and right outer sheets 20 and 50.

The method of manufacturing the air bag cushion 10 will be described with reference to the above-mentioned drawings and FIGS. 4A to 4F. FIGS. 4A to 4F are sectional views taken along line A-A of FIG. 3 and illustrating the process of sewing the sheets 20, 30, 40 and 50 in sequence.

Figure 4A:
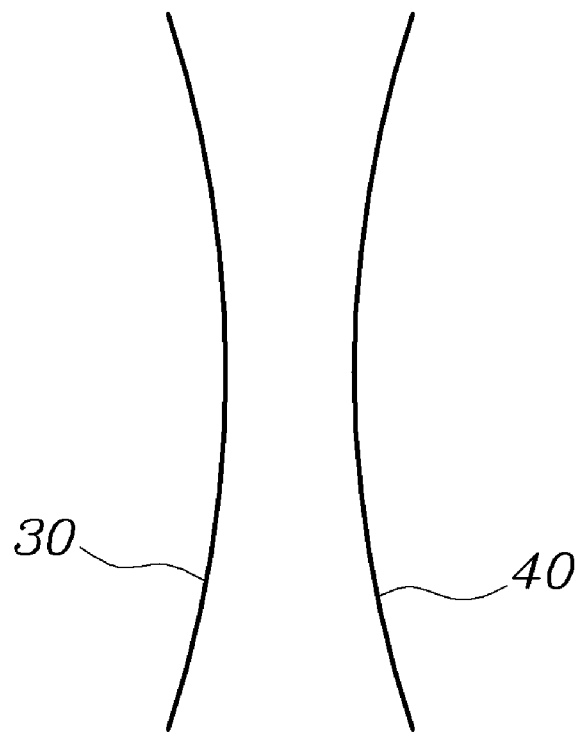
FIGS. 4A to 4F are views illustrating the process of manufacturing the air bag cushion of FIG. 2 in stages.
Figure 4B:
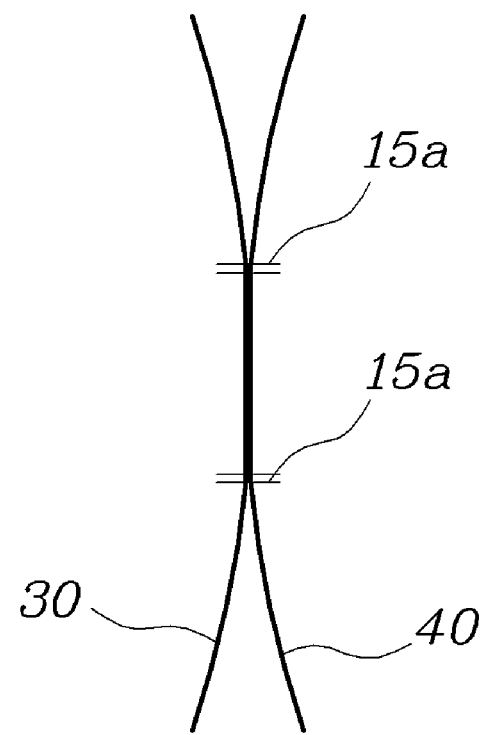

As shown in FIGS. 4A and 4B, in the state where the left inner sheet 30 and the right inner sheet 40 face each other, the front portions of the sheets 30 and 40 are sewn along the sewing lines 15a in the shape of a closed curve, thus forming the connection part 15. Further, the rear ends of the left and right inner sheets 30 and 40 are sewn, thus forming the partition part 16 (see FIG. 3).

Figure 4C:
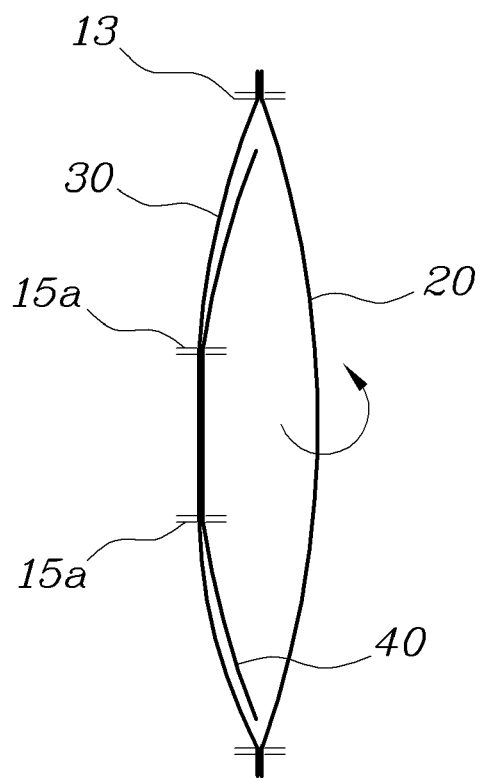
Figure 4D:
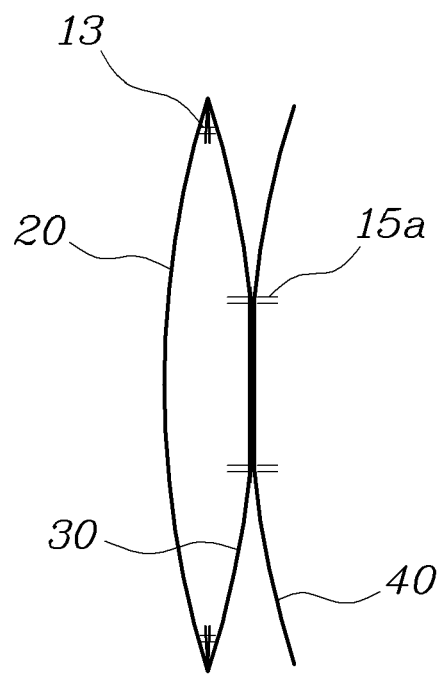

As shown in FIG. 4C, in the state where the left outer sheet 20 is placed to a side of the right inner sheet 40, the left outer sheet 20 and the left inner sheet 30 are sewn along the edge sewing lines 13. Next, a pocket formed by the left outer sheet 20 is turned inside out. Thereby, the left chamber 11 having the edge sewing lines 13 therein is obtained as shown in FIG. 4D.

Figure 4E:
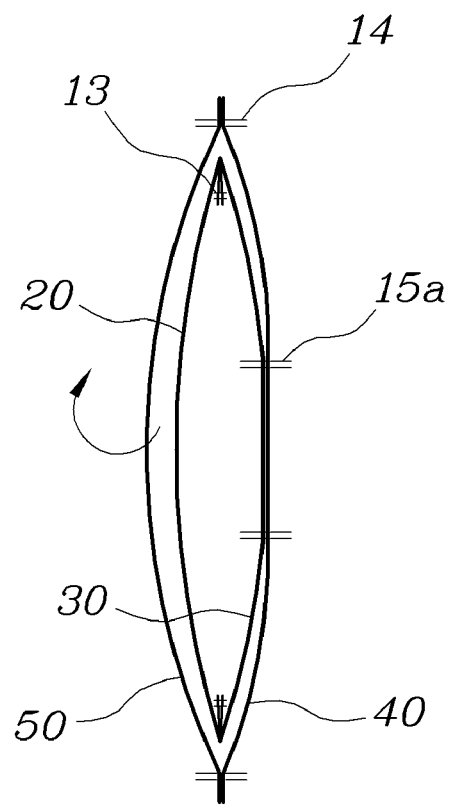

In the above-mentioned manner, as shown in FIG. 4E, in the state where the right outer sheet 50 is placed to a side of the left outer sheet 20, the right outer sheet 50 and the right inner sheet 40 are sewn along the edge sewing lines 14. Next, the right outer sheet 50 is turned inside out. Thereby, the right chamber 12 having the edge sewing lines 14 therein is obtained as shown in FIG. 4F.

Such a sewing sequence enables the easy sewing of the sheets 20, 30, 40 and 50, in spite of the existence of the connection part 15. The sequence of sewing the sheets 20, 30, 40 and 50 may be changed. For example, the right chamber 12 may be firstly formed by sewing the right inner sheet 40 and the right outer sheet 50 along the sewing lines 14 after placing the left inner sheet 30 between the right inner sheet 40 and the right outer sheet 50.

Figure 5A:
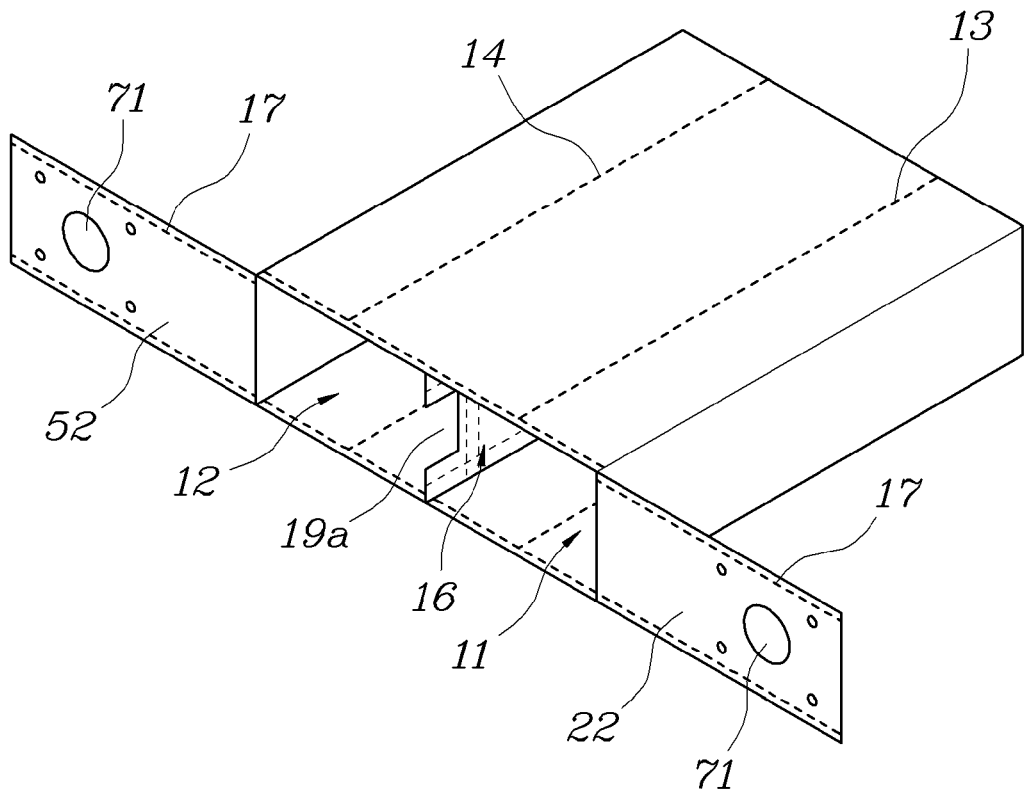
FIGS. 5A and 5B are views illustrating the process of finishing the rear end of the air bag cushion of FIG. 2.
Figure 5B:
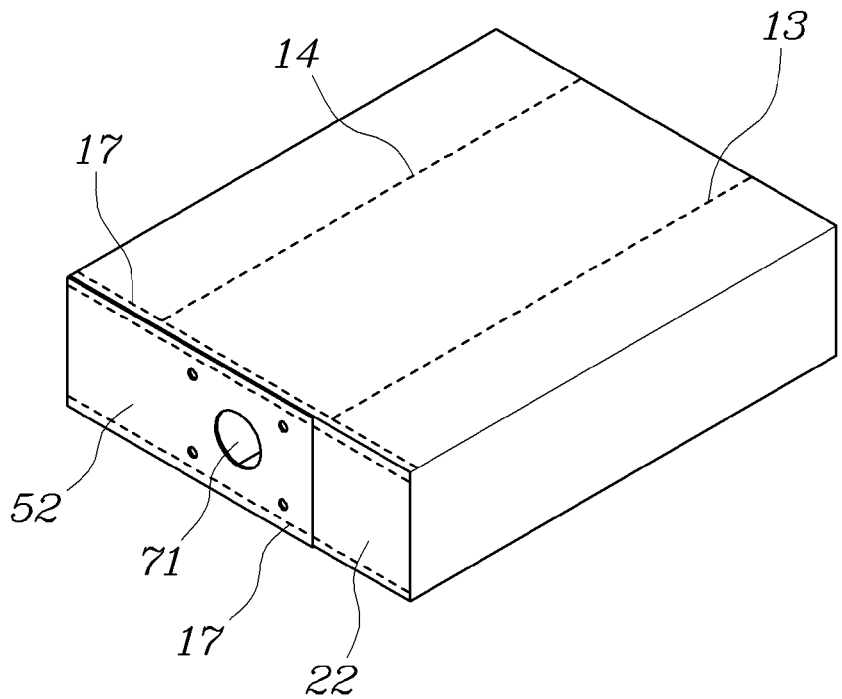

FIGS. 5A and 5B are schematic views illustrating the process of forming the gas injection part 19 using the rear ends 22 and 52 of the left and right outer sheets 20 and 50. It should be understood that the shape of the air bag cushion shown in the drawings may be different from an actual shape since the drawings are schematically shown.

Figure 4F:
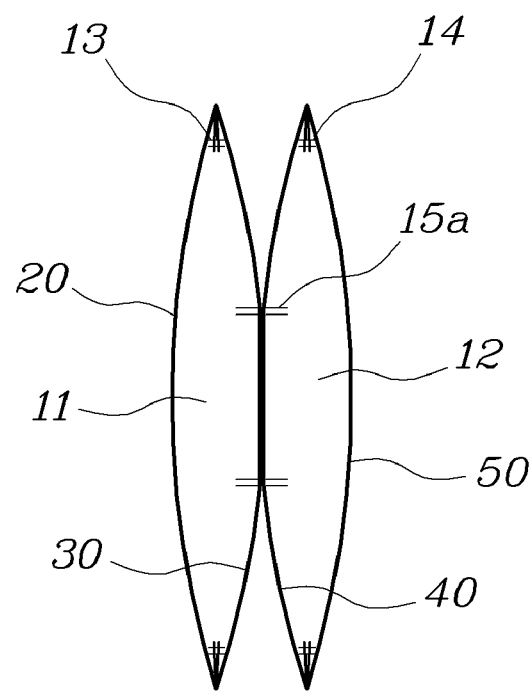

Referring to FIGS. 2, 3, 5A and 5B, after the rear ends 22 and 52 of the left and right outer sheets 20 and 50 are folded from the state of FIG. 4F such that the inflator holes 71 overlap each other, the rear ends 22 and 52 are sewn together with the front ends 21 and 51 of the sheets 20 and 50 along the sewing lines 17, so that the gas injection part 19 is formed at the rear ends of the left and right chambers 11 and 12. The gas discharge port of the inflator 70 is inserted through the inflator holes 71 into the gas injection part 19, and the inflator 70 is coupled to the retainer ring by fastening members which are fitted into the mounting holes 72.

Figure 6A:
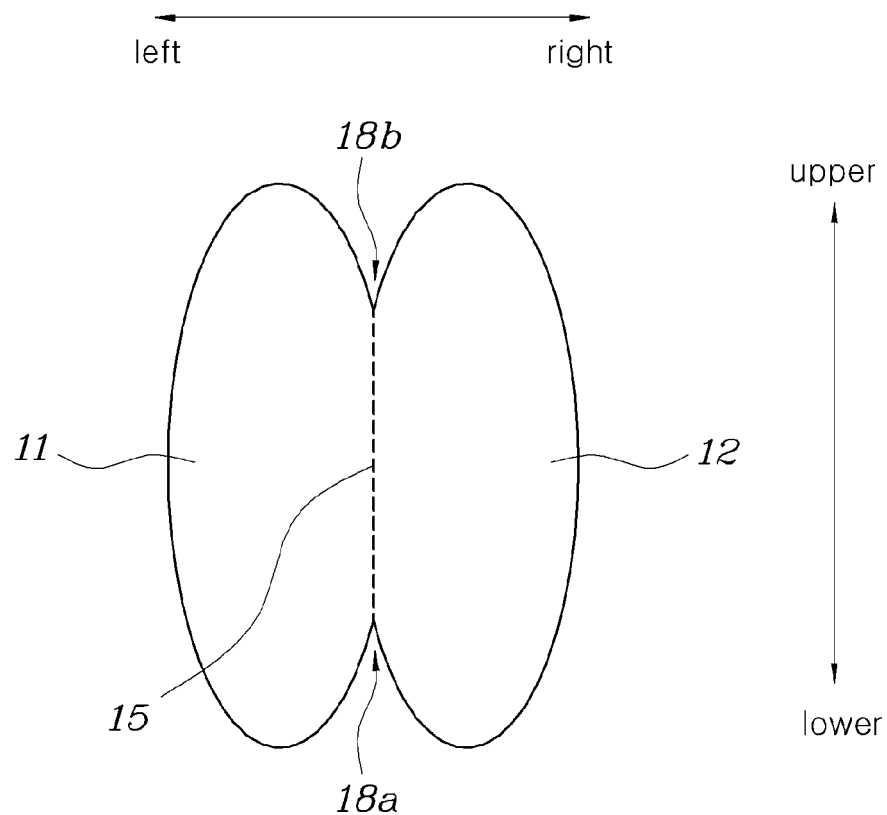
FIGS. 6A and 6B are schematic views illustrating other air bag cushions according to the present invention.
Figure 6B:
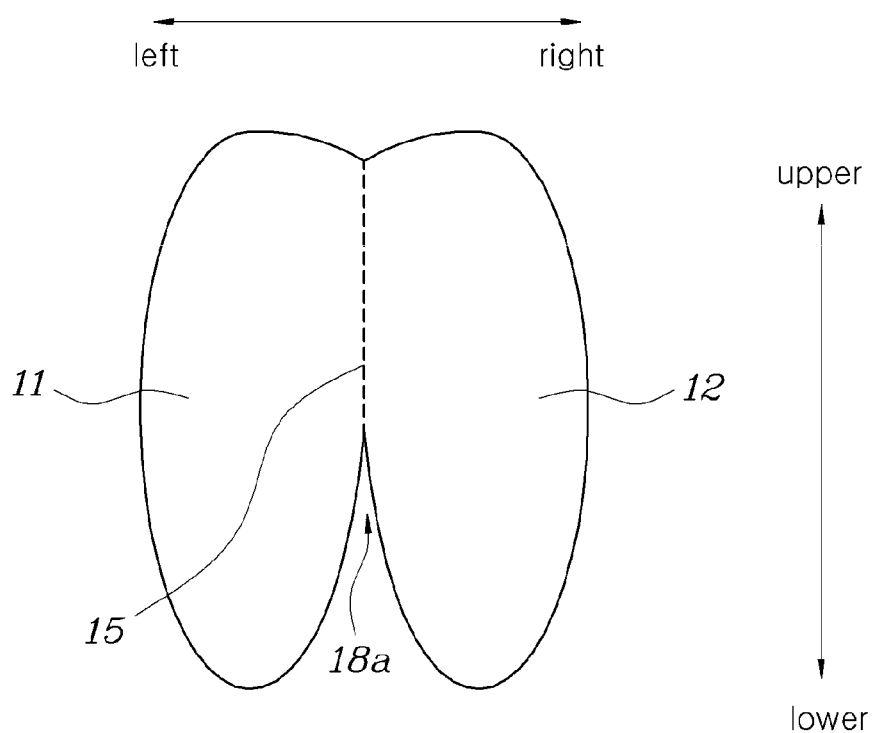

Referring to FIGS. 6A and 6B, the connection of the left and right chambers 11 and 12 which is made through the connection part 15 enables the shape of the valley 18a and the chambers 11 and 12 to be variously changed as necessary. For example, the valley 18a may be formed from the upper portions of the left and right chambers 11 and 12 to the lower portions thereof as shown in FIG. 6A, or may be formed such that there is a deep valley 18a in the lower portions of the left and right chambers 11 and 12 as shown in FIG. 6B. All of the above-mentioned shapes of the air bag cushion are useful when it comes to protecting a passenger.

Figure 7A:
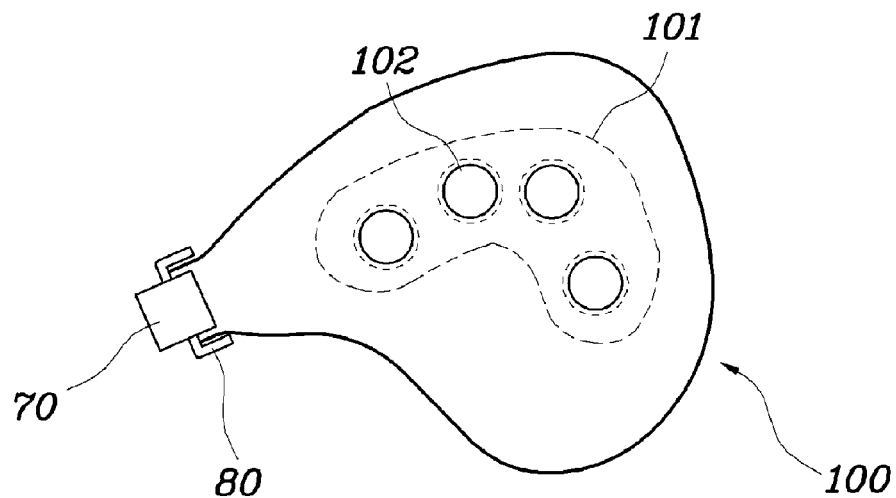
FIGS. 7A to 7F are schematic views illustrating other air bag cushions according to the present invention.
Figure 7B:
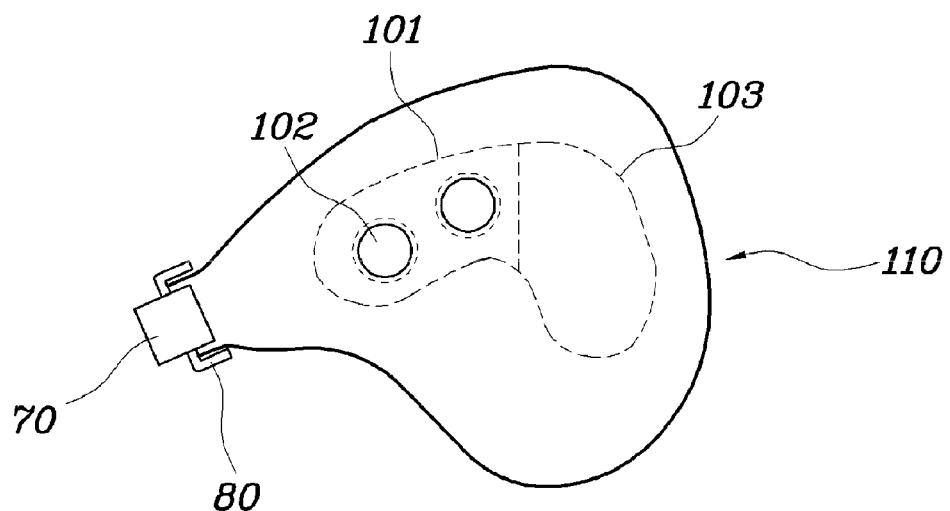
Figure 7C:
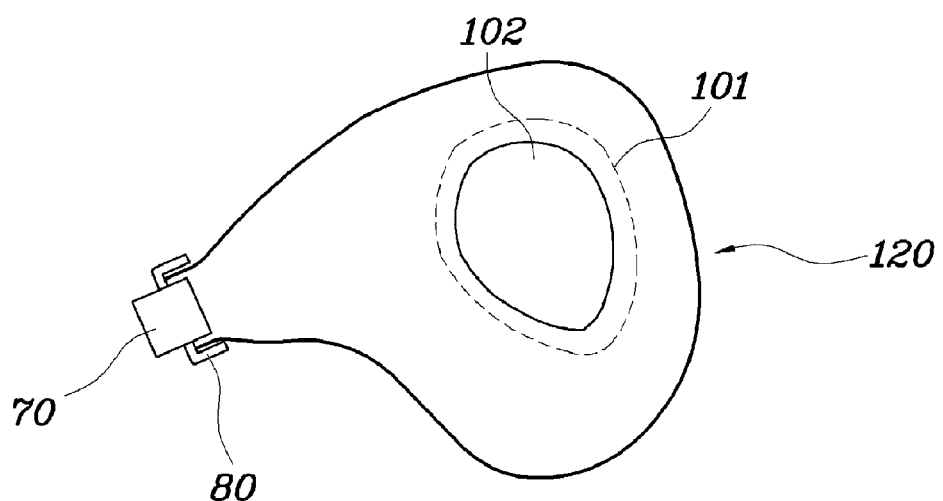
Figure 7D:
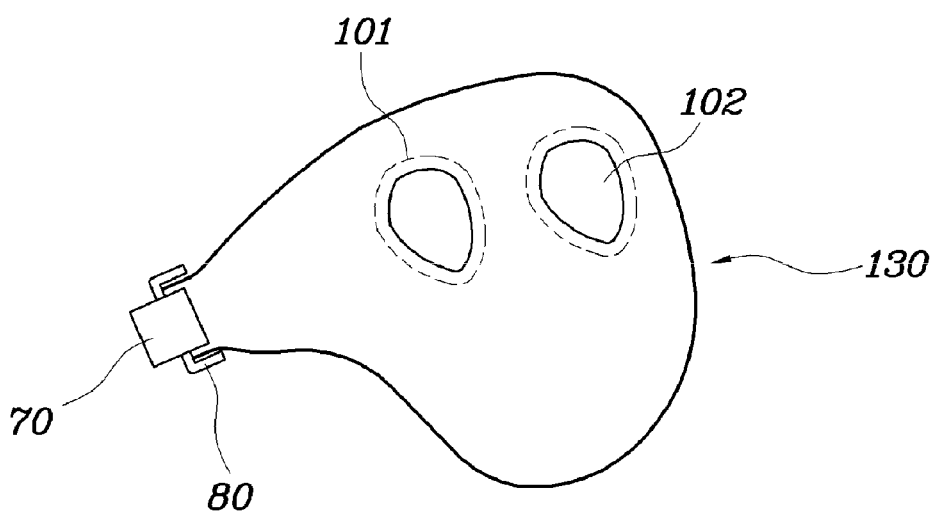

Referring to FIGS. 7A, 7C and 7D, the shape and number of connection parts 101 of the air bag cushions 100, 120 and 130 according to various embodiments of the present invention and the shape and number of the through holes 102 in an area of the connection part 101 may be changed.

Figure 7E:
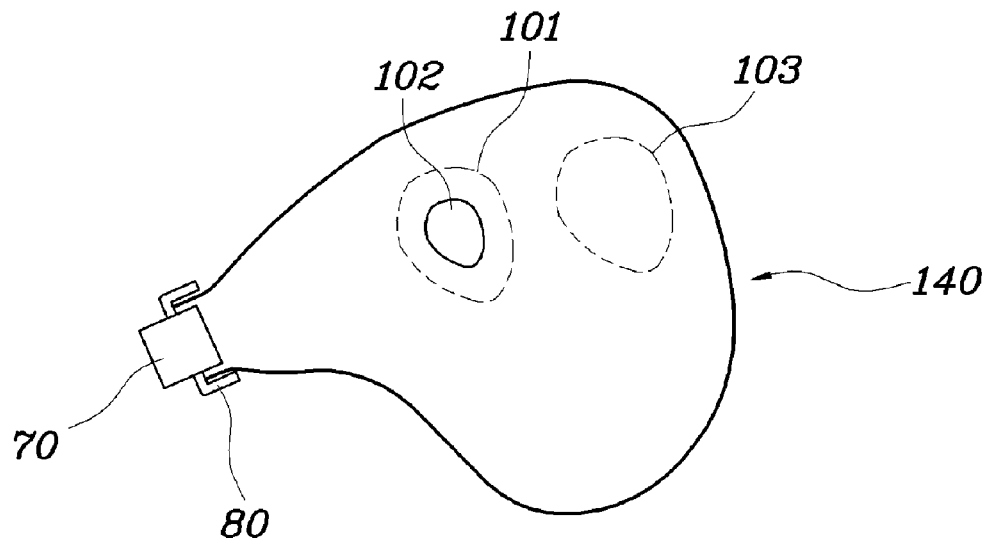
Figure 7F:
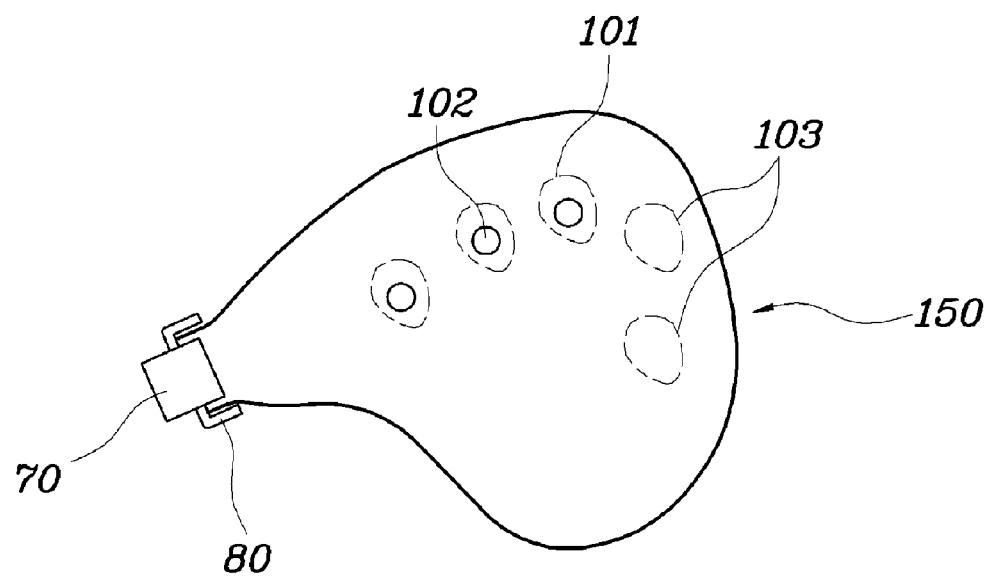

Further, referring to FIGS. 7B, 7E and 7F, the air bag cushions 110, 140 and 150 according to various embodiments of the present invention may further include a joining part 103 which is placed in front of an associated connection part 101 and made by sewing the left and right inner sheets 30 and 40 together along sewing lines in the shape of a closed curve. The joining part 103 may be sewn using thread which is thinner than that of the connection part 101 or may be sewn more thinly than the connection part 101. The joining part 103 is provided in front of the connection part 101 and ripped by collision with a passenger, thus absorbing impact and protecting the passenger.

Figure 8A:
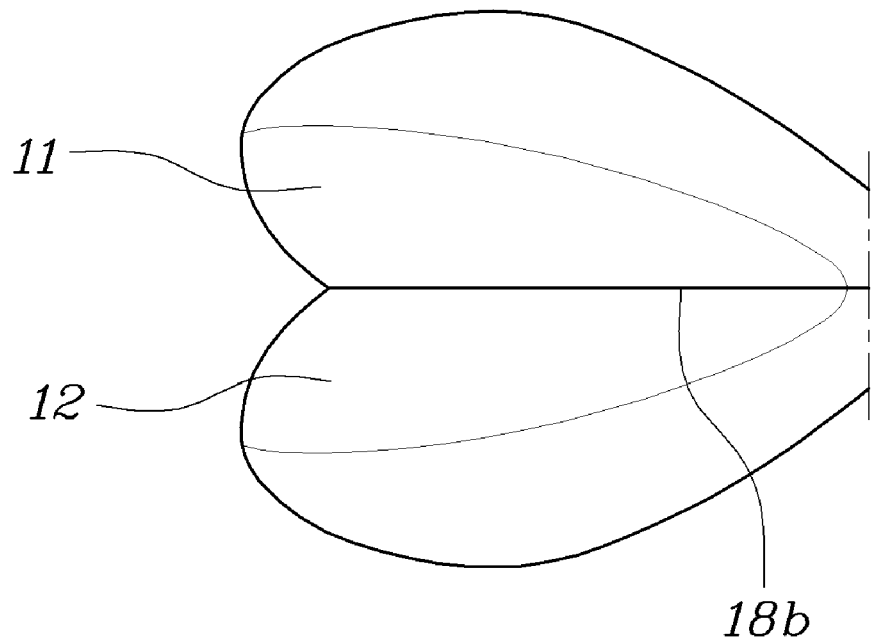
FIGS. 8A to 8C are a plan view, a front view, and a right side view illustrating the air bag cushion manufactured according to the present invention, respectively.
Figure 8B:
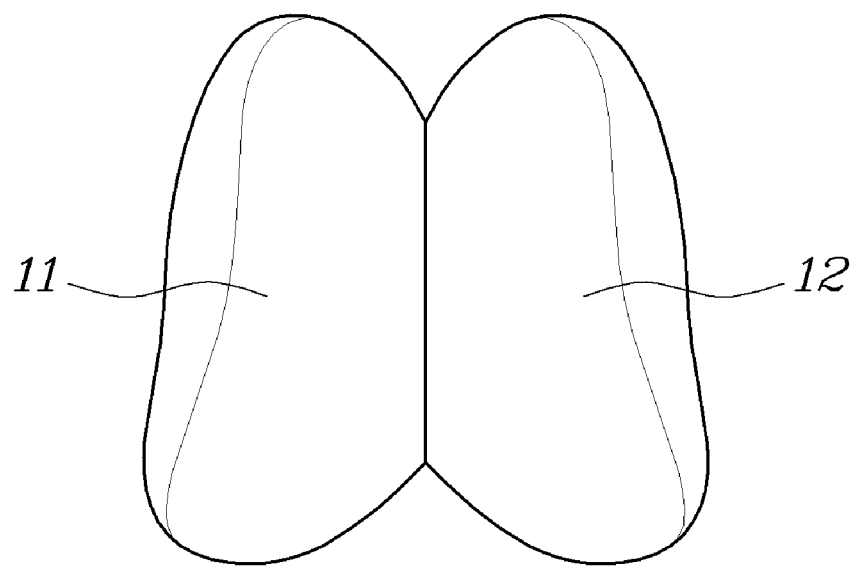
Figure 8C:
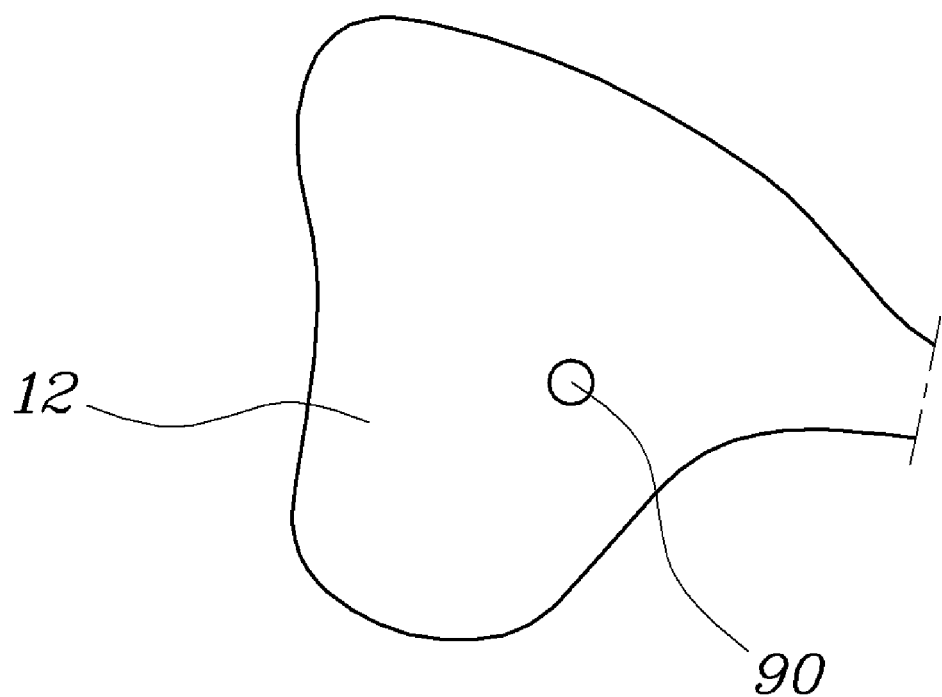

FIGS. 8A to 8C are drawings illustrating a cushion sample manufactured according to various embodiments of the present invention and seen at several angles. The sample is manufactured to check the manufacturability and convenience of the cushion according to the various embodiments. The rear end corresponding to the gas injection part is not assembled and is omitted from the drawings.

Meanwhile, according to other embodiments, the rear end and the front end of the cushion may be manufactured using separate sheets and then be sewn to provide a space for the gas injection part. Reference numeral 90 of FIG. 8C denotes an exterior vent hole which functions to reduce the internal pressure of the air bag cushion under given conditions.

As described above, the present invention provides an air bag cushion having a vertical two-chamber structure, which is simple in structure.

Further, the present invention provides an air bag cushion, which allows left and right chambers to uniformly expand.

Furthermore, the present invention provides an air bag cushion having a vertical two-chamber structure, which allows a valley to assume a variety of shapes which can easily be realized.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air bag cushion for vehicles, the air bag cushion comprising:
 a left chamber configured to expand towards a left side of an upper part of a body of a passenger;
 a right chamber configured to expand towards a right side of the upper part of the body of the passenger;
 at least one connection part formed in respective front portions of the left and right chambers by sewing facing inner surfaces of the left and right chambers along sewing lines in a shape of closed curve to form a vertical valley which separates the left and right chambers from each other;
 wherein a through hole is formed in the connection part to permit gas to flow between the left and right chambers, and at least one joining part placed in front of the connection part and provided by sewing the left and right inner sheets to each other along sewing lines in a shape of a closed curve.

2. The air bag cushion as set forth in claim 1, wherein the left chamber comprises a left outer sheet and a left inner sheet sewn along an edge thereof to the left outer sheet, and the right chamber comprises a right inner sheet sewn to the left inner sheet at the connection part and a rear end thereof, and a right outer sheet sewn along an edge thereof to the right inner sheet.

3. The air bag cushion as set forth in claim 2, wherein the left chamber is provided by sewing the left and right inner sheets to each other at the connection part, sewing the left outer sheet and the left inner sheet to each other along edges thereof with the right inner sheet placed between the left outer sheet and the left inner sheet, and turning the left outer sheet inside out.

4. The air bag cushion as set forth in claim 2, wherein the right chamber is provided by sewing the left and right inner sheets to each other at the connection part, sewing the right outer sheet and the right inner sheet to each other along edges thereof with the left inner sheet placed between the right outer sheet and the right inner sheet, and turning the right outer sheet inside out.

5. The air bag cushion as set forth in claim 2, wherein rear ends of the left and right inner sheets are sewn vertically and horizontally so that a partition part is provided at rear ends of the left and right chambers to partition the left and right chambers from each other.

6. The air bag cushion as set forth in claim 5, wherein a gap at which the left and right inner sheets are not sewn is provided between the connection part and the partition part.

7. The air bag cushion as set forth in claim 1, wherein a gas injection part is provided in the rear ends of the left and right chambers in such a way as to communicate with the chambers, with gas being injected from an inflator to the gas injection part.

8. The air bag cushion as set forth in claim 1, wherein the joining part is formed to become ripped more easily than the connection part.

9. The air bag cushion as set forth in claim 1, further comprising:

a tether passing through the connection part and connecting the left and right chambers to each other in a lateral direction of the air bag cushion.

10. The air bag cushion as set forth in claim 9, wherein a first end of the tether is connected to the left outer sheet and a second end of the tether is connected to the right outer sheet.

11. An air bag assembly comprising the air bag cushion as set forth in claim 1, the air bag assembly further comprising an inflator configured to inflate the air bag cushion, and a housing for accommodating the air bag cushion and the inflator.

* * * * *